United States Patent [19]
Leiber et al.

[11] 3,772,567
[45] Nov. 13, 1973

[54] ACCELEROMETER
[75] Inventors: Heinz Leiber, Leimen; Anton Rodi, Karlsruhe, both of Germany
[73] Assignee: Teldix GmbH, Heidelberg, Germany
[22] Filed: Nov. 17, 1971
[21] Appl. No.: 199,643

[30] Foreign Application Priority Data
Aug. 23, 1971 Germany............ P 21 42 147.6

[52] U.S. Cl..................... 317/5, 73/517, 303/21 CG
[51] Int. Cl........................ G01p 15/08, B60t 8/06
[58] Field of Search.................. 317/5; 200/61.45; 73/535

[56] References Cited
UNITED STATES PATENTS
3,654,410 4/1972 Miller ........................... 200/61.45
3,614,173 10/1971 Branson ......................... 317/5

Primary Examiner—L. T. Hix
Attorney—George H. Spencer et al.

[57] ABSTRACT

An accelerometer having means for providing a delayed response and which follows the actual rate of change in velocity. The accelerometer follows the actual effective deceleration and/or acceleration with a delay due to its time constant and responds only after a time interval after a deceleration and/or acceleration threshold has been exceeded by the actual deceleration. There is provided means effective directly after the delayed response to the accelerometer for rendering further influence of an increase in the deceleration and/or acceleration ineffective whereby response of the accelerometer ceases without delay when the actual deceleration and/or acceleration falls below the threshold. The accelerometer furnishes an output signal particularly useful for influencing pressure at brakes of a vehicle provided with an antilocking control system.

7 Claims, 9 Drawing Figures

PATENTED NOV 13 1973 3,772,567

ACCELEROMETER

BACKGROUND OF THE INVENTION

This invention relates to an accelerometer which has a delay based on its time constant. The present invention more particularly relates to an accelerometer provided with a delay and which responds after the actual deceleration or acceleration exceeds a deceleration and/or acceleration threshold.

Antilocking control systems are known in which either only the occurrence of a certain deceleration value and/or acceleration value or additionally slip signals are sensed at the wheels of a vehicle and the brake pressure is regulated in dependence on these sensed signals.

In U.S. Pat. No. 3,556,610 a system is disclosed which effects a pressure reduction in a wheel brake, when a given deceleration threshold has been reached, not directly, but only when the deceleration threshold continues to be exceeded for a period of time, this period being shorter the stronger deceleration of the wheel. This makes interferences on the control path (e.g. uneven roadways, unbalanced wheels, irregular brake discs, and the like) ineffective.

With the use of a mass sensor such a delayed response is realized by damping of a spring connected mass. When the speed of the wheel is differentiated and the differential voltage is compared with the threshold voltages, special circuits are provided to obtain the delay time.

SUMMARY OF THE INVENTION

It is an object of the present invention to provide an accelerometer which follows the actual rate of change in velocity with a delay, its response being terminated directly after the actual acceleration, which may be positive or negative, falls below a threshold value.

It is another object of the present invention to provide an accelerometer particularly useful for influencing pressure at the brakes of a vehicle.

These objects, as well as other objects which will become apparent in the discussion which follows, are achieved by providing in an accelerometer a delay means for providing a delayed response. The accelerometer follows actual rate of change in velocity with a delay due to its time constant and responds only after a time interval after a rate of change in velocity threshold has been exceeded by the actual rate of change in velocity. The accelerometer furnishes an output signal which is particularly useful for influencing pressure at brakes of a vehicle provided with an antilocking control system. The accelerometer includes means effective directly after its delayed response for rendering further influence of an increase in the rate of change in velocity ineffective. The response of the accelerometer ceases without delay when the actual rate of change in velocity falls below the threshold.

According to a feature of the present invention the accelerometer is so designed that immediately after the delayed response of the accelerometer further influence in the direction of an increase in the deceleration and/or acceleration is ineffective for the accelerometer so that when the actual deceleration and/or acceleration falls below the threshold, the response of the accelerometer is terminated quickly without delay.

The present invention can be used for substantially all types of accelerometers but is particularly useful for rotational acceleration determination. It is based on the knowledge that, on the one hand, a time delay is permissible for the response of the accelerometer when the deceleration and/or acceleration increases, or is even desirable for the stated reasons, but that, on the other hand, such a time delay is useless for the control system when the deceleration and/or acceleration decreases. A time delay when, for example, the deceleration threshold is passed downwardly, would lead to too strong a pressure reduction and thus to too much reacceleration of the wheel. An efficient controller has a rapid pressure reduction speed of, e.g. 5,000 gauge atmospheres per second. Consequently the rotational deceleration path is rapidly reversed and the rotational deceleration rapidly drops after a certain pressure reduction. If now, due to the delay time, the pressure is still reduced for, e.g. 1 millisecond after the rotational deceleration has fallen below its threshold, this constitutes a further pressure reduction of 5 gauge atmospheres. This further pressure reduction results in too much of a reacceleration of the wheel.

The requirement of the present invention for an undelayed signal change at the accelerometer output when the threshold is passed, can be realized in a mass sensor which is damped, for example, with oil, by an abutment which becomes effective after closing of a contact. Care must only be taken that no contact chatter occurs and the contact, if it simultaneously constitutes the abutment with a high spring constant, must not be made entirely rigid. The abutment keeps the mass sensor in a position in which it can open the contact without delay in spite of the oil damping when the deceleration or acceleration falls below that required to close the contact and need not return any significant distance first which would result in a delay.

In order to also avoid a delay when changing from deceleration to acceleration and vice versa, the sensor is provided, according to a preferred embodiment of the present invention, as a dual mass sensor for sensing a deceleration as well as an acceleration each mass being able to be deflected in only one direction of rotation from its starting position. Each direction of rotation is limited by an abutment which becomes effective with the closing of a contact.

If two deceleration thresholds and/or acceleration thresholds are required, a preferred embodiment of the present invention provides that the abutment be associated with a contact closing at the higher deceleration and/or acceleration threshold. A further contact for signaling the passing of the lower threshold may be a spring which increases the spring effect.

According to a preferred embodiment of the present invention a differentiating circuit with a subsequently connected threshold value switch is used. The differentiating circuit differentiates a voltage proportional to the rotational speed of a wheel. The output voltage of the differentiating circuit is compared with one threshold voltage or a plurality of threshold voltages and a switching signal is produced when the threshold voltage is exceeded in any case. The time constant of the differentiating circuit effects the time delay which is made ineffective, in order to produce an undelayed signal change after the threshold has been passed downwardly in that a return is provided for the switching signal or a signal dependent thereon which keeps the output voltage of the differentiating circuit constant from the moment the switching signal appears. In this embodiment the present invention provides the additional advantage that it is not necessary, for reasons of delay, to take care that the time constant of the differentiating circuit be small which would require a low output voltage.

To keep the output voltage of the differentiating circuit constant from the moment the threshold is reached, it is possible to influence either the voltage at the input of the differentiating circuit accordingly by means of a feedback signal or the time constant RC of the differentiating circuit can be appropriately varied by the feedback signal. The simplest way, in the latter case, is to influence the effective resistance of the differentiating circuit.

If the delay is to be avoided, similarly as for the dual mass sensor, at the change of sign of the rate of change of velocity, two differentiating circuits are provided which respond to voltages having different polarities.

According to a further embodiment of the present invention it is also possible to provide more than one feedback path to the differentiating circuit of which at least one effects a change of the time constant by a certain value and the other one keeps the output voltage of the differentiating circuit constant.

DESCRIPTION OF THE PREFERRED EMBODIMENTS

Figure 1:
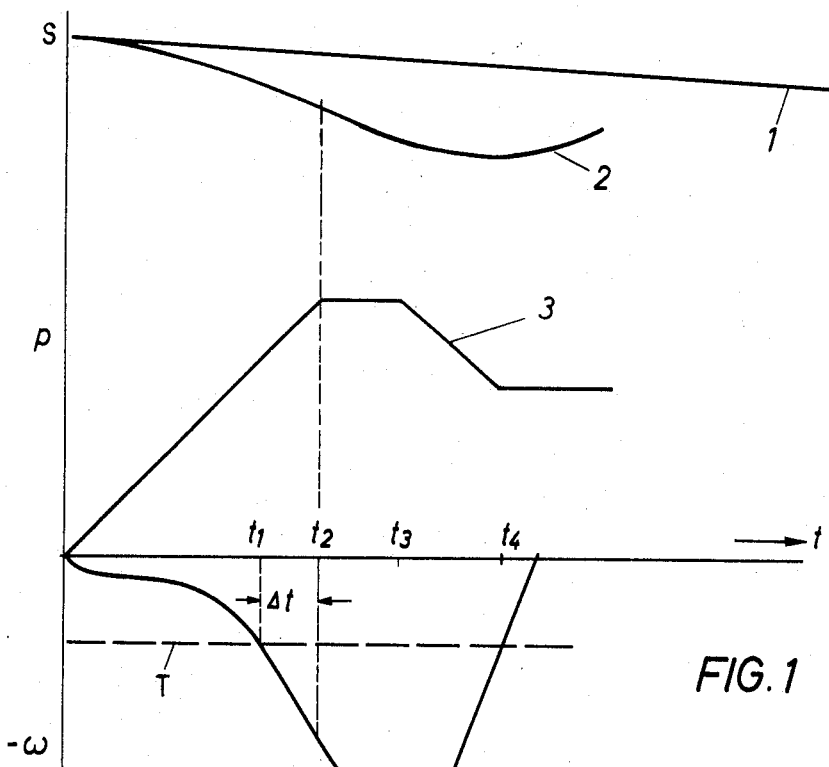
FIG. 1 is a graphical time diagram of the pressure, deceleration and speed curves for a vehicle which has its brake pressure controlled by the use of the present invention.

In FIG. 1 characteristic curve of vehicle speed of a vehicle which is braked from time 0 is designated 1. The wheel speed S of the braked vehicle follows a curve 2. The brake pressure P is shown by a curve designated 3. Deceleration of the wheel of the braked vehicle is shown by a curve 4.

If the wheel is charged with a brake pressure P, represented by the curve 3, which is too high for the ground it is traveling on, the deceleration $-\omega$ shown in the curve 4, of the wheel strongly increases and exceeds at time $t_1$ a threshold value T. As already mentioned, the brake pressure P, shown by curve 3, is not influenced right away but only when it has been found that no external interference is present. The accelerometer therefore operates with a delay provided in a known manner. It responds only after time $\Delta t$ (time point $t_2$). Now the brake pressure P, as shown by that portion of curve 3 after $t_2$ is first kept constant to check the further behavior of the wheel. In the system under observation brake pressure reduction is to be initiated only when the rotational speed of the wheel has dropped by a certain percentage (e.g. 5–10 percent) after occurrence of the deceleration signal. This percentage is assumed to be reached at time $t_3$, whereupon the pressure P, as illustrated by that portion of the curve 3 after $t_3$, is reduced until time $t_4$, where the rotational deceleration of the wheel has just fallen below the deceleration threshold value T. For the above stated reasons it has been found to be very important that no further pressure reduction be permitted after the threshold value T is passed downwardly since otherwise the reacceleration of the wheel would be too strong. It is thus essential to stop the pressure reduction as soon as the actual deceleration $-\omega$, shown by the curve 4, has fallen below the threshold value T and to then keep the pressure constant again in order to await the further behavior of the wheel.

Figure 2:
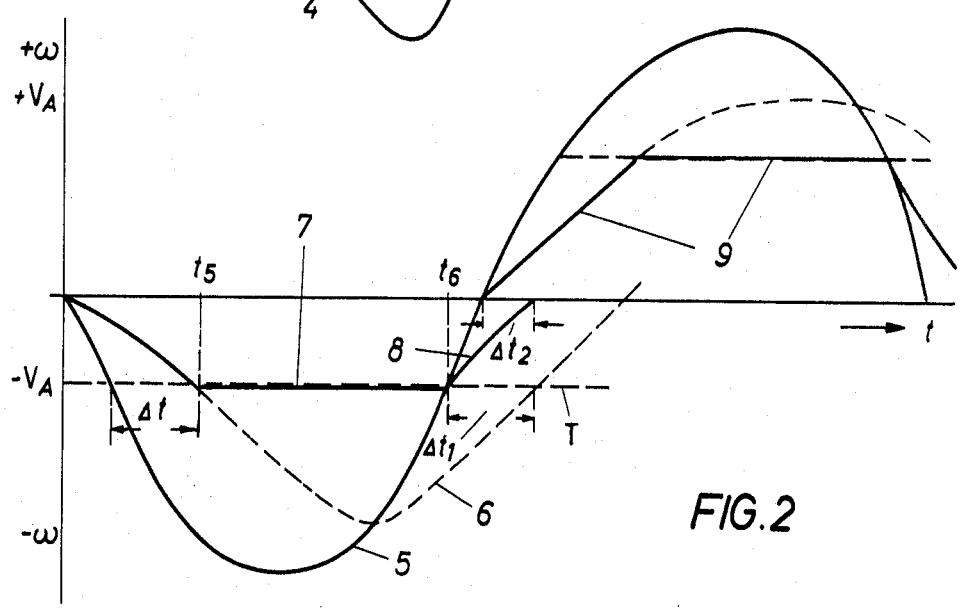
FIG. 2 is a graphical time diagram showing possible curve for the deceleration and acceleration of a vehicle wheel as well as the path derived therefrom by the use of the present invention.

In order to meet the resulting actually oppositely directed requirements, i.e. time-delayed response and undelayed termination of the response, characteristics illustrated by curves as shown in FIG. 2 are required. FIG. 2 shows a possible actual course of the deceleration $-\omega$ and acceleration $+\omega$ of the wheel by a curve designated 5. As already mentioned, the accelerometer is to respond with a delay of $i \Delta t$. It can thus have the course designed by a curve 6 and shown partially in dashed lines, this course being either the output voltage $V_A$ of a differentiating circuit of an electronic accelerometer, or the deflection of a mass of a spring connected damped mass sensor. In both cases a time delay $\Delta t1$ would also occur between the moment, when the actual deceleration passes the deceleration threshold value T downwardly and the moment, when the accelerometer changes its signal which, as already mentioned, must not happen. Care must therefore be taken that the accelerometer be provided with an abutment characteristic, i.e. cannot follow the curve 6 in its dashed portion, but is kept in a state which corresponds to the curve 7. This means an abutment for the mass sensor which prevents further rotation after the threshold value T has been reached at time $t_5$. For the electronic accelerometer, the output voltage of its differentiating circuit must be kept constant via feedback circuit starting at the time $t_5$. If this measure is taken, it is accomplished that when the actual rotational deceleration $-\omega$ falls below the threshold value T at time $t_6$, the accelerometer records this falling below and changes its output signal practically simultaneously. The accelerometer is deactuated according to curve 8, also with a slight delay but it effects the signal change at the time $t_6$ without any delay.

In FIG. 2 it is assumed that a separate accelerometer is provided for sensing acceleration. In the mechanical case this means using a dual mass sensor. Each mass can rotate from its starting position only on one direction. Accordingly, in the electronic accelerometer two differentiating circuits may also be provided which each respond only to acceleration signals with one sign. This assures that the accelerometers start up at the occurrence of a certain acceleration and not only after a delay $\Delta t_2$. The same considerations as for the deceleration $-\omega$ also apply to the occurrences at positive acceleration $+\omega$. Here, too the accelerometer responds with a delay when the threshold value T has been reached, but falls below the threshold value T without delay. If the additional time delay $\Delta t_2$ is considered acceptable, one mass or a single differentiating circuit designed for the rotational deceleration and acceleration will suffice and there will still be the advantage of the undelayed signal change upon passing below the threshold value T. This curve 9 on the acceleration $+\omega$ side is also of interest for brake controllers, particularly when it is not the reaching of the threshold value T but the falling below this threshold value T which is used to change the pressure, i.e. the termination of a constant pressure phase and the beginning of a pressure buildup.

Figure 3:
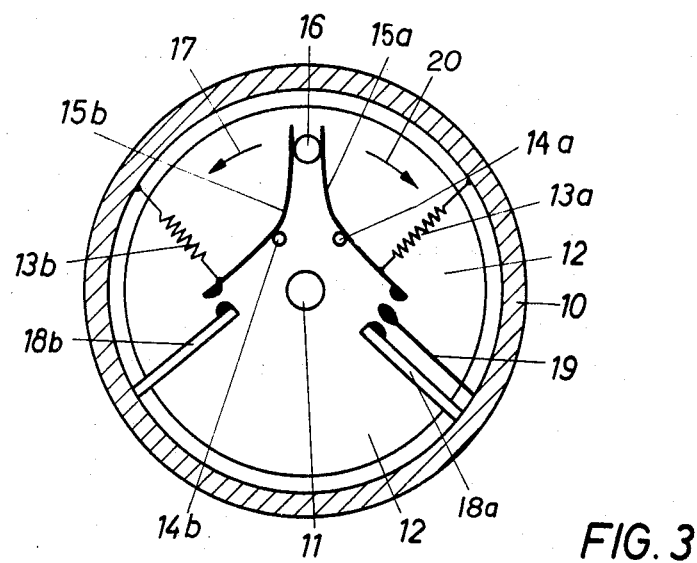
FIG. 3 is a diagramatic view of an embodiment of a mass sensor accelerometer, partially in section, in which the present invention is employed.
Figure 4:
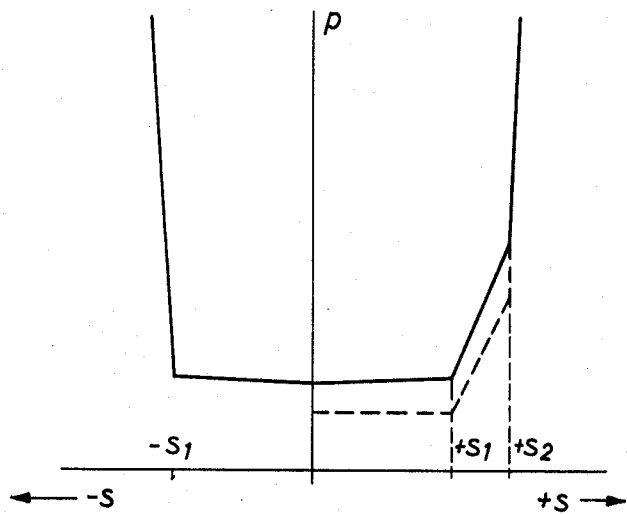
FIG. 4 shows the paths of the spring forces in the sensor illustrated in FIG. 3.

Referring to FIG. 3 a mass sensor rotational accelerometer employing the present invention includes a housing 10 shown in a sectional view which is fastened to a wheel. A mass 12 which is disposed in the housing 10 and is rotatable relative thereto is mounted conventionally for rotation about an axis 11. The mass 12 is held in its starting position by means of two levers 15a and 15b which are biased respectively by springs 13a and 13b and rotatably mounted at points 14a and 14b respectively and by means of a pin 16, fixed to the mass and substantially enclosed by end portions of the two levers 15a and 15b. If, due to a deceleration, the mass 12 rotates with a delay caused by the damping oil, in the direction of arrow 17, the lever 15b makes contact with a contact 18b after a certain amount of rotation. This contact 18b, as are the levers 15a and 15b, is made rigid in a first approximation and thus also acts as an abutment which prevents further rotation of the mass 12 and thus assures immediate opening of the contact 18b when the deceleration falls below a given threshold value. The contact 18b serves as an abutment and yields only to such an extent that contact chatter is prevented but that upon effective abutment of the mass 12, the mass 12 is brought in such a position that immediate opening of the contact 18b is assured. The spring forces acting on the mass 12 upon deflection are shown in the left half of FIG. 4 where the curve of pressure P is plotted in dependence on deflection $-S$. Up to a point $-S_1$ (closing of contact) only the weak spring 13b is effective while starting with the point $-S_1$ a steeply increasing counterforce of the practically rigid contact 18b acting as an abutment becomes effective.

Upon the occurrence of an acceleration the mass 12 rotates in the direction of arrow 20. The lever 15a thus first comes in contact with a contact spring 19 so that a first acceleration contact is closed. Upon further rotation of the mass 12 the spring action of the contact spring 19 must additionally be overcome, until the second, practically rigid contact 18a has been reached which also simultaneously serves as an abutment. The spring forces against which the mass 12 must move are shown in the right-hand portion of FIG. 4; in a first region, up to a point $+S_1$, the spring 13a is effective, then additionally up to a point $+S_2$ the spring contact 19 and finally the contact 18a acting as an abutment. For example, when a contact carried on an end of the lever 15a and the contact 18a close, the pressure P is rapidly increased and when a threshold is passed at which the contact consisting of spring contact 19 and the contact carried by the lever 15a is opened, the pressure P is increased more slowly.

Figure 5:
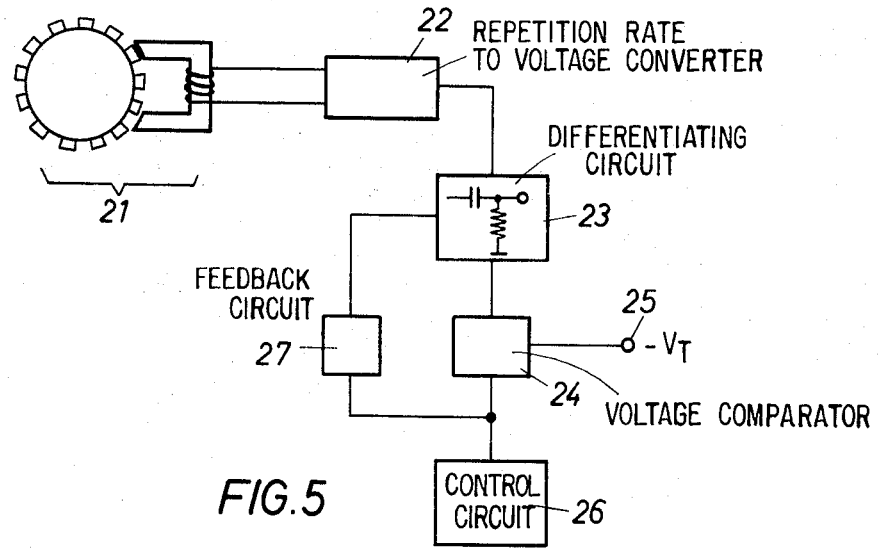
FIG. 5 is a block circuit diagram of an embodiment of a controller in which the present invention is employed.

FIG. 5 illustrates a controller which includes an electronic accelerometer constructed according to the present invention. A sensor, designated generally by the numeral 21, for producing a pulse train is provided, the pulse repetition rate of the sensor 21 being proportional to the rotational speed of the wheel. A pulse repetition rate to direct voltage converter 22 is provided for producing a direct voltage whose value corresponds to the rotational speed of a wheel. To derive a signal corresponding to the deceleration of the acceleration a voltage differentiating circuit 23 is provided whose output voltage is compared in a voltage comparator 24 with a threshold voltage $V_T$ supplied at a terminal 25. If, for example, the output voltage of the differentiating circuit 23 which corresponds to the deceleration of the wheel increases beyond the threshold voltage $V_T$, and output signal is obtained from the voltage comparator 24 which is fed to an electronic or electric control circuit 26 and is there converted into instructions for pressure variation, e.g. for keeping the pressure constant. In order to obtain a sufficient output voltage and to suppress interferences, the time constant of the differentiating circuit 23 is selected to be relatively high. Due to the high time cnstant, the input voltage to the voltage comparator 24 from the differentiating circuit 23 is delayed. To avoid a delayed deactuation, the present invention provides that the output voltage of the differentiating circuit 23 be kept constant starting with the time its output voltage reaches the level of the threshold voltage $V_T$. For this purpose a feedback circuit 27 is provided from the output of voltage comparator 24 to the differentiating circuit 24, which is effective with the appearance of the output signal at the voltage comparator 24. This results in a curve of the output voltage from the differentiating circuit 23 corresponding to the curve 7 of FIG. 2. The output voltage from the differentiating circuit 23 can be kept constant by influencing its input voltage, the effective capacitor size in its RC circuit as well as the effective size of the resistor in its RC circuit with the signal from the feedback circuit 27. Varying the effective size of the resistor is the more easily accomplished.

Figure 6:
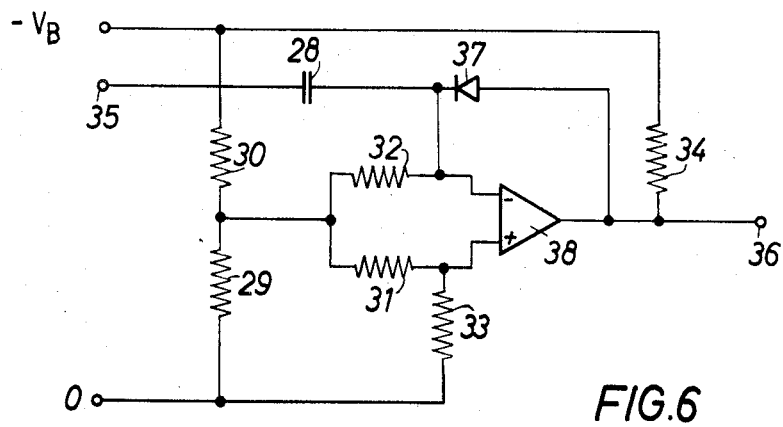
FIG. 6 is a block circuit diagram of an embodiment of an electronic accelerometer according to the present invention.

FIG. 6 illustrates a circuit which includes a detailed embodiment of a differentiating circuit, of a voltage comparator and of a feedback circuit particularly useful as a resistance influencing circuit. These circuits may advantageously be used respectively for the differentiating circuit 23, the voltage comparator 24 and the feedback circuit 27 shown in FIG. 5.

The differentiating circuit of FIG. 6 effectively consists of a capacitor 28 and a resistance which is substantially formed by a resistor 32, since resistors 29 and 30 have a much lower ohmic value than resistors 31, 32, 33. The voltage comparator of the circuit shown in FIG. 6 is an operational differential amplifier 38 with a high voltage amplification which receives through its one input terminal a fixed direct voltage as well as the output voltage of the RC circuit and through the other terminal a fixed comparison voltage. The comparison voltage is produced by a voltage divider which includes the resistors 31–33 and differs by a certain threshold value from the fixed direct voltage at the other input which is again produced by dividing the battery voltage $-V_B$ by means of a voltage divider which includes the resistors 29-30. A voltage corresponding to the speed of the wheel is fed in at a terminal 35. If the voltage at the output of the differentiator drops below the comparison voltage, a positive signal results at the output of the differential amplifier 38, and is fed for evaluation to a terminal 36 and simultaneously serves to keep the upper input of the differential amplifier 38 constant via a diode 37 whose resistance is controlled. The diode 37 furnishes the correct amount of current so that the voltage at the upper input can drop no further. The function of the diode 37 can also be so described that it always forms such a resistance, together with a resistor 34 and the resistor 32, that the output voltage of the differentiator is kept constant as soon as the differential amplifier 38 signals that a threshold has been reduced.

Figure 7:
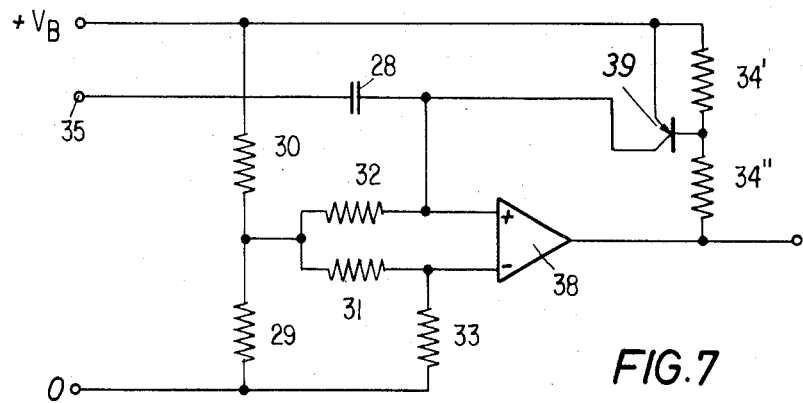
FIG. 7 is a block circuit diagram of another embodiment of an electronic accelerometer according to the present invention.

In the embodiment shown in FIG. 7, the diode 37 (FIG. 6) has been replaced by the emitter-collector path of a transistor 39 which is controlled at its base by a signal derived via series connected resistors 34' and 34'' from the output signal of the operational differential amplifier 38. The remaining parts of the circuit of FIG. 7 correspond to parts of the circuit shown in FIG. 6, the same reference numerals being used to identify identical parts.

Figure 8:
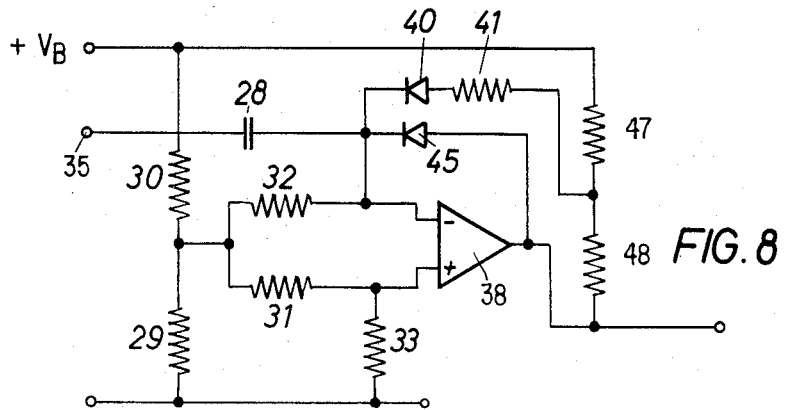
FIG. 8 is a block circuit diagram of a further embodiment of an electronic accelerometer according to the present invention which has two threshold values.
Figure 9:
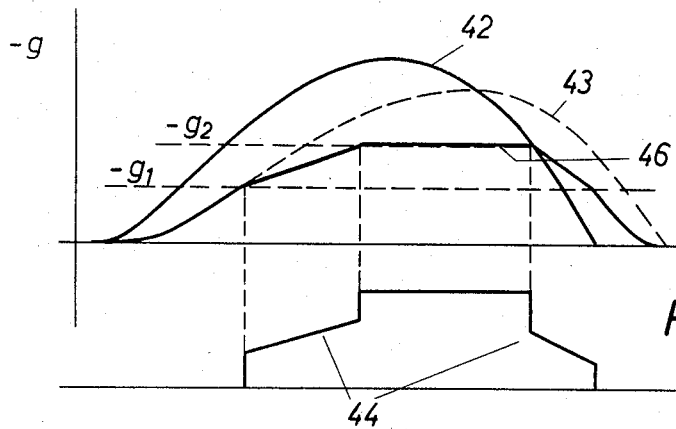
FIG. 9 is a graphical time diagram helpful in understanding the electronic accelerometer illustrated in FIG. 8.

In FIG. 8 an electronic accelerator circuit is shown which has two thresholds, i.e. corresponds to the mass accelerometer of FIG. 3. If the negative acceleration threshold $-g_1$, shown graphically in FIG. 9, is exceeded, the time constant, and consequently also the output voltage of the operation differential amplifier 38, are reduced, via a diode 40, by the addition of a high ohmic value resistor 41. The output voltage of the differentiating circuit thus reaches the next switching threshold $-g_2$, shown graphically in FIG. 9, even later. The remaining parts of the circuit of FIG. 8 correspond to those parts shown in FIG. 6 having the same reference numerals. In the circuit of FIG. 8, a pair of series connected resistors 47 and 48 are provided in place of the resistor 34 (FIG. 6) in order to provide proper differing biases for the diodes 45 and 40.

In FIG. 9 the numeral 42 indicates an actual acceleration curve and the numeral 43 a time-delayed path due to the original time constant of the differentiating circuit portion of the circuit shown in FIG. 8. If the threshold $-g_1$ is exceeded, which is determined by the differential amplifier 38 (FIG. 8) the output voltage of the differentiating circuit increases even slower. When threshold $g_1$ is exceeded an output signal, as shown by curve 44, results at the differential amplifier 38 (FIG. 8) which initially increases slowly. At a certain voltage finally diode 45 (FIG. 8) becomes effective which operates in the manner described in connection with FIG. 6 and effects keeping the output from the differentiating circuit constant as graphically shown by curve 46 in FIG. 9. During this keeping constant phase the output signal, as shown by curve 44, of the differential amplifier is higher and also constant. When the second threshold $-g_2$ is exceeded the output signal of amplifier 38 is changed without delay so that the delay upon passing of the second threshold is also reduced. The output of amplifier 38 is slowly reduced between the two thresholds $-g_2$ and $-g_1$.

Significant for the present invention when sensing a deceleration is that a positive voltage is fed back while with a positive acceleration a negative feedback is necessary.

As shown in FIG. 8 for the effective variation of the differentiating circuit, its input voltage can also be influenced by the feedback, the circuit requiring an additional small dropping resistor.

It will be understood that the above description of the present invention is susceptible to various modifications, changes and adaptions, and the same are intended to be comprehended within the meaning and range of equivalents of the appended claims.

We claim:

1. Accelerometer including means for producing an electrical signal, which depends upon the actual positive and/or negative acceleration but which, due to its time constant, follows the actual acceleration with time delay and including threshold means, with at least one given threshold value, the threshold means developing a switching signal when the time-delayed signal depending upon the actual acceleration exceeds the given threshold value, whereby — due to the said time delay — the threshold means responds a time interval later than the actual acceleration has exceeded a corresponding threshold value, the improvement comprising feedback means responsive to the switching signal for causing the acceleration depending electrical signal to be maintained substantially constant when the actual acceleration further increases thus causing the response of the threshold means to cease without delay when the actual acceleration drops below said threshold.

2. An arrangement as defined in claim 1 wherein said means for producing an acceleration depending electrical signal comprises differentiating means for deriving a voltage signal corresponding to the actual acceleration from a voltage depending on rotational speed of a wheel, said differentiating means having a time constant effecting said delayed response; and said threshold means develops the switching signal in response to said voltage signal exceeding a given level; and said feedback means responsive to said switching signal keeps the output voltage of said differentiating means constant immediately after said given level has been reached.

3. An arrangement as defined in claim 2 wherein said feedback means is coupled to said differentiating means for influencing the input voltage to said differentiating means.

4. An arrangement as defined in claim 2 wherein said feedback means is coupled to said differentiating means for varying its time constant to keep said output voltage constant.

5. An arrangement as defined in claim 4 wherein said differentiating means includes a resistance and said feedback means is coupled to said differentiating means for varying said resistance.

6. An arrangement as defined in claim 2 wherein said differentiating means comprises a first differentiating circuit responsive to voltage of one polarity and threshold means for producing a negative acceleration switching signal and a second differentiating circuit responsive to voltage of opposite polarity and threshold means for producing a positive acceleration switching signal.

7. An arrangement as defined in claim 2 further comprising at least one further feedback means for effecting a change in said time constant of said differentiating means by a certain value, the first said feedback means being effective for keeping constant said output voltage of said differentiating means.

* * * * *